(12) United States Patent
Feye-Hohmann et al.

(10) Patent No.: US 6,827,591 B2
(45) Date of Patent: Dec. 7, 2004

(54) ELECTRICAL DEVICE AND UNIT CONSISTING OF AN ELECTRICAL DEVICE AND LAMP DIFFUSER

(75) Inventors: Jürgen Feye-Hohmann, Detmold (DE);
Wolfgang Ebert, Trostberg (DE);
Gunther Löhmann, Wangen (DE);
Axel Becker, Puchheim (DE)

(73) Assignees: Phoenix Contact GmbH & Co., Blomberg (DE);
Patent-Treuhand-Gesellschaft fuer elektrische Gluehlampen mbH, Munich (DE)

(*) Notice: Subject to any disclaimer, the term of this patent is extended or adjusted under 35 U.S.C. 154(b) by 162 days.

(21) Appl. No.: 09/799,519

(22) Filed: Mar. 7, 2001

(65) Prior Publication Data

US 2001/0020828 A1 Sep. 13, 2001

(30) Foreign Application Priority Data

Mar. 7, 2000 (DE) ......................................... 100 10 356

(51) Int. Cl.[7] .............................................. H01R 13/648
(52) U.S. Cl. ........................................ 439/92; 439/532
(58) Field of Search ........................ 439/92, 532, 76.1; 362/374, 375, 396, 355, 455, 368

(56) References Cited

U.S. PATENT DOCUMENTS

| 3,700,887 | A | * | 10/1972 | Marx | 362/396 |
| 5,171,085 | A | * | 12/1992 | Jaksich | 362/147 |
| 5,766,032 | A | * | 6/1998 | LaPointe et al. | 439/371 |
| 5,964,521 | A | * | 10/1999 | Caya | 362/344 |
| 6,099,144 | A | * | 8/2000 | Klaus | 362/263 |
| 6,162,096 | A | * | 12/2000 | Klaus | 439/617 |
| 6,264,348 | B1 | * | 7/2001 | Ellis | 362/375 |
| 6,290,522 | B1 | * | 9/2001 | Campolo et al. | 439/241 |

FOREIGN PATENT DOCUMENTS

| DE | 7138560 | 5/1973 |
| DE | 33 10 477 | 1/1984 |
| DE | 34 37 667 | 4/1986 |
| DE | 44 40 854 | 5/1995 |

* cited by examiner

*Primary Examiner*—Gary F. Paumen
*Assistant Examiner*—Edwin A. Leon
(74) *Attorney, Agent, or Firm*—Nixon Peabody LLP; David S. Safran

(57) ABSTRACT

An electrical device such as a ballast for fluorescent lamps and including a housing, a terminal, and a catch element for connecting the terminal to the housing, the catch element including a catch leg for connecting the terminal to the catch element and for connecting the catch element to the housing. Accordingly, the electrical device is designed such that the individual terminal sites of the terminal have minimal positional tolerance so that the terminal can be wired with an automatic installation machine without the danger of misinsertions.

11 Claims, 4 Drawing Sheets

ELECTRICAL DEVICE AND UNIT CONSISTING OF AN ELECTRICAL DEVICE AND LAMP DIFFUSER

BACKGROUND OF THE INVENTION

1. Field of the Invention

The present invention relates generally to an electrical device such as a ballast for fluorescent lamps, and an electrical unit including an electrical device and a lamp diffuser.

2. Description of the Related Art

Ballasts for fluorescent lamps, conventionally made typically as electronic ballasts, are generally attached to fluorescent lamps by hand, for example, mounted in a lamp diffuser. To install one such electronic ballast, typically an elongated hole is punched out in the ballast housing so that the housing may be attached to the lamp diffuser using bolts and nuts or rivets which are routed through the elongated hole. The housing also includes a circuit board provided therein, the circuit board having as the terminal element typically a terminal with a plurality of terminal sites. Generally, it is necessary to ground the electronic ballast housing and the circuit board, and may be achieved using an electrically conductive connection between the electronic ballast housing and the lamp diffuser via a separate cable connection. In such a case, the circuit board is grounded using a terminal site provided thereon via the electronic ballast housing.

Another possibility of grounding the electronic ballast housing and the circuit board is to use toothed lock washers when the nuts are screwed to the mounting bolts, the washers reliably separating any oxide or enamel layer which may be present on the lamp diffuser bottom or on the side surface of the housing so as to ensure good electrical contact for grounding by the screw attachment itself. This type of mounting of an electrical ballast in a lamp diffuser is disadvantageous since it results in high manual installation cost and imprecision in the positioning of the individual terminal sites of the terminal relative to the electronic ballast housing and relative to the lamp diffuser. This leads especially to problems when wiring the fluorescent lamps, therefore connection of individual wires of one or more cables to the terminal sites is done using automatic installation machines. If the terminal sites are inaccurately positioned, misinsertions of individual wires in the terminal sites often occur. Consequently, in order to prevent such an occurrence, an optical pattern recognition system is used for recognizing and accordingly correcting the positional inaccuracies of the terminal sites. The use of one such optical pattern recognition system is however very complex and accordingly expensive.

Even if the electronic ballast housing is positioned relatively accurately by fusing one border of the elongated hole in the electronic ballast housing as a stop, and thus, as a local reference base, the positional accuracy of one terminal site at a time is determined by a plurality of tolerances such as the positional tolerance of the terminal sites on the terminal, the positional tolerance of the terminal on the circuit board, the positional tolerance of the circuit board in the electronic ballast housing, the positional tolerance of the attachment of the electronic ballast housing to the lamp diffuser, etc. The amounts of these tolerances in the least favorable case is accumulatively added to one another. In the worst case, local displacement of the individual terminal sites occurs and corresponds at least to half the distance between two adjacent terminal sites or even exceeds the distance so that in this case misinsertions are inevitable in the wiring of the fluorescent lamp by means of automatic installation machines.

SUMMARY OF THE INVENTION

An object of the present invention is to provide an electrical device such as a ballast device for fluorescent lamps, and an electrical unit including one such electrical device and a lamp diffuser, in which the individual terminal sites of the terminal have only low positional tolerance so that wiring is made possible with an automatic installation machine without the danger of misinsertions.

The electrical device in accordance with the present invention is achieved by providing a catch element having at least one leg for attaching a terminal to the housing. In particular, the at least one leg connects the catch element to the terminal, and also attaches the catch element to the electric ballast housing. Thus, in accordance with the present invention, the catch element acts essentially as an intermediate piece between the terminal and the electric ballast housing, preferably, the connection of the terminal to the catch element on the one hand and the connection of the catch element to the housing on the other always taking place using the same catch leg. In this regard, when the terminal is attached to the electric ballast housing, there is a single reference point, specifically the attachment site of the catch leg on the catch element. Thus, the chain of tolerances which accumulate in the worst case, i.e., the chain which is present in the prior art, is avoided so that the accuracy of the local position of the individual terminal sites of the terminal relative to the housing is enhanced.

According to an exemplary embodiment of the present invention, at least one side wall of the electric ballast housing has a recess and the catch leg of the catch element is locked therein. Preferably, in order to minimize the aforementioned location inaccuracies of the terminal sites, the process takes place such that the size of the recess in the side wall of the housing is exactly matched to the size of the area of the catch leg fitting into the recess, thereby, the catch leg which is locked in the recess has essentially no more play.

Generally the electric ballast housings include two side walls positioned opposite and in parallel to one another. In an exemplary embodiment of the present invention, the catch element has exactly two catch legs which are preferably likewise opposite parallel to one another and in the two side walls of the housing there is one recess each for receiving the two catch legs. The size of the recesses is preferably matched exactly to the size of the area of the catch leg fitting into the recesses so that ultimately the catch element locked in the housing essentially no longer has any play.

The terminal is attached to the catch element according to an embodiment of the invention using at least one catch leg, and in the case of two catch legs, each leg having one inner projection which extends laterally over either the bottom of the terminal which is typically formed by the circuit board, or another area of the terminal which is suitable for this purpose, such that the terminal locks. In order to attach the terminal in the catch element, it is thus necessary for the two catch legs to be able to deflect to the outside when the terminal is pressed into the catch element in order then to snap over the bottom of the catch element again as soon as the terminal has been inserted deeply enough into the catch element.

According to a preferred embodiment of the invention, the catch element has two side walls whereby each side wall includes two catch legs, and whereby the side walls are connected to one another on the front side of the catch element with the front wall. This is advantageous especially in that the circuit board which is connected to the terminal or to which the terminal is attached is not limited in this way by the size of the catch element and can clearly extend to the rear over the catch element. Preferably, the catch element is otherwise provided with a bottom. Finally, in the electrical device in accordance with the present invention, the catch element generally is composed of an electrical nonconductive material such as a plastic.

In a preferred embodiment of the electrical device in accordance with the present invention, at least one of the front wall and the bottom of the catch element is used as bottom insertion protection. This bottom insertion protection essentially leads to insulation being ensured between the terminal sites or the electrical conductors connected to the terminal sites even when a metal part such as a screw, is positioned between the terminal and the bottom or the side walls of the housing, or when the electrical line is detached from the terminal site. Moreover, insulation of the inner area of the housing can be included at the inside surface of the housing and the housing bottom by covering them with an electrically insulating film.

A electrical unit in accordance with the present invention unit includes an electrical device as described above, and a lamp diffuser having a bottom, whereby the bottom of the electrical unit is provided with a slot, the bottom of the lamp diffuser includes a catch clip locked in the slot. One especially advantageous embodiment of the electrical unit arises especially by the terminal being attached by means of the above described catch element in the housing. By having such a design, the side walls of the housing having the aforementioned recesses punched out and the slot has been punched out in the housing bottom preferably in a single punching process with a single punching tool. In this way, between the recesses in the side walls of the housing on the one hand and the slot in the housing bottom on the other the minimum possible spacing tolerances are achieved so that as a result, by fitted insertion and catching of the housing on the catch clip on the bottom of the lamp diffuser, optimum positioning of the housing with the terminal installed on the lamp diffuser is achieved with minimum local tolerances.

According to another preferred embodiment of the above described electrical unit, the catch clip and the lamp diffuser bottom are made as one piece. Preferably, the catch clip is partially punched out of the lamp diffuser bottom and is bent out. Accordingly, the catch clip is punched out of the lamp diffuser so that the punched-out area which is designed to form the catch clip can be bent out of the plane of the lamp diffuser bottom so that the catch clip preferably projects at an angle of 90° relative to the lamp diffuser bottom. For catching purposes, the catch clip preferably has at least one elastic catch tongue which is easily bent out of the plane of the catch clip. When the catch clip is inserted into the slot provided in the housing bottom this area springs back into the plane of the catch clip so that the housing can be pushed onto the catch clip and prevents removal or sliding back of the housing in its fully slipped-on and thus locked state.

A electrical unit in accordance with the present invention includes an electrical device, such as an electrical device as previously described, and a lamp diffuser which is provided with a bottom, is otherwise detached from the above described means, whereby the lamp diffuser bottom has a upwardly protruding grounding barb of electrically conductive material and the grounding barb is connected to the ground connection of the terminal. As a result, simple and reliable grounding of the terminal, and with a corresponding connection of the terminal to the housing, also grounding of the housing, are achieved which is automatically accomplished when attaching the housing to the lamp diffuser.

One especially simple embodiment of the grounding barb arises by the grounding barb and the lamp diffuser bottom being made in one piece and the grounding barb being partially punched out of the lamp diffuser bottom and bent out. In doing so, the grounding barb can be laterally routed past the housing in order to come into contact with the terminal. One preferred embodiment is, however, characterized in that the grounding barb is electrically connected to the housing, especially to the housing bottom. Finally, another preferred embodiment of the unit in accordance with the present invention is characterized in that the grounding barb is routed electrically conductively through a recess provided in the housing bottom.

DETAILED DESCRIPTION OF THE PREFERRED EMBODIMENTS

Figure 1:
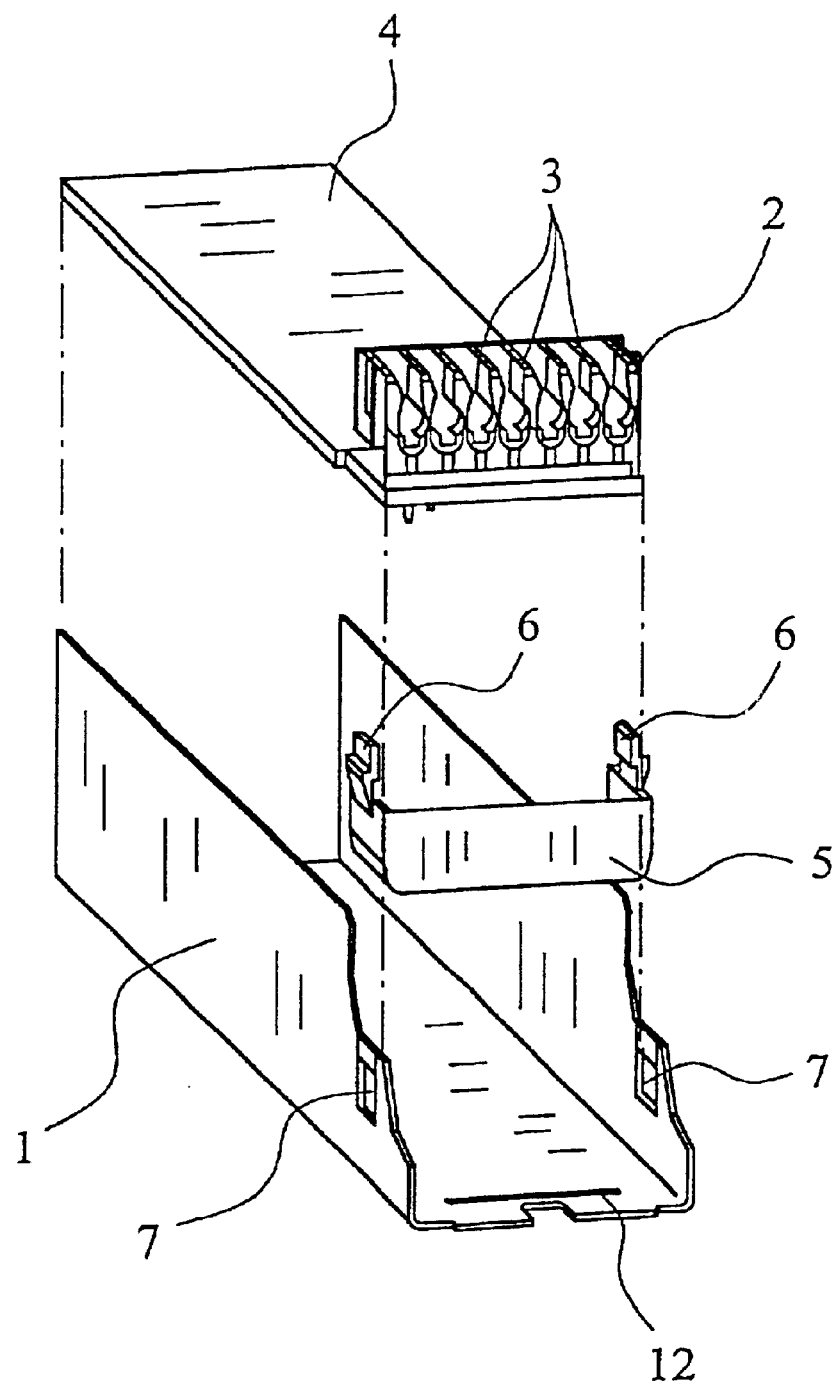
FIG. 1 shows an embodiment of an electrical device in accordance with the present invention.

And now to the drawings, in which FIG. 1 shows an electrical device, specifically a ballast for a fluorescent lamp, according to one preferred embodiment of the invention in an unassembled state. The electrical device has a housing 1 in which a terminal 2 is to be attached. The terminal 2 has terminal sites 3 and is located on the circuit board 4. The terminal 2 is attached in the housing 1 using a catch element 5 which acts as the intermediate piece between the housing 1 and the terminal 2. The catch element 5 has catch legs 6 which are parallel to one another, as is apparent from FIG. 2, and which fit into the recesses provided in the side walls of the housing 1, and, in the installed state of the catch element 5, are locked in recesses 7 on the side walls. The catch legs 6 are provided on the side walls 8 of the catch element 5 so that the catch legs 6 likewise face one another in parallel. The side walls 8 of the catch element 5 are connected to one another by the front of the catch element 5 being closed by the front wall 9. As FIG. 3 shows, the catch element 5 has a bottom 10 so that for the terminal 2 there is insulating separating the terminal 2 from the bottom of the housing 1.

The electrical device including the housing 1, the terminal 2 and the catch element 5 is assembled such that a film of electrical insulation (not shown) is inserted into the housing 1, then the catch element 5 is locked into the housing 1 and finally the terminal 2 with the circuit board 4 is locked into the catch element 5. The catch element 5 is preferably made of an elastic plastic so that lateral movements of the catch leg 6 with respect to the bottom 12 of catch element are allowed, which is an advantageous of the catch function of the catch leg 6. In addition, the side walls 8, the front wall 9 and the bottom 10 of the catch element 5 form electrical insulation protection, especially also bottom insertion protection.

Figure 2:
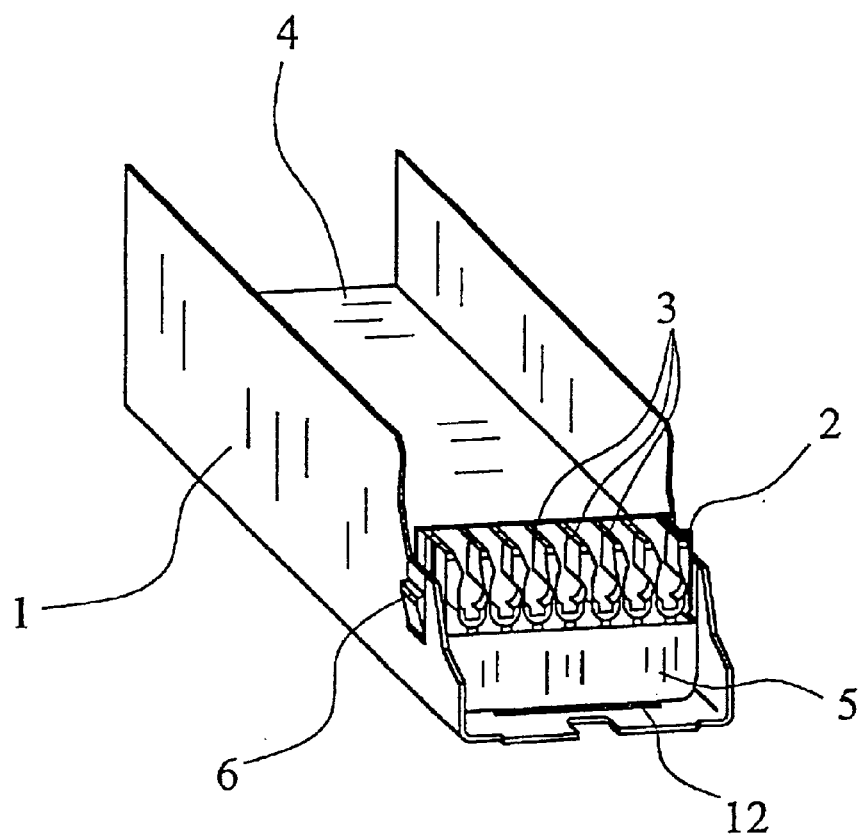
FIG. 2 shows an assembled view of the electrical device as shown in FIG. 1.
Figure 3:
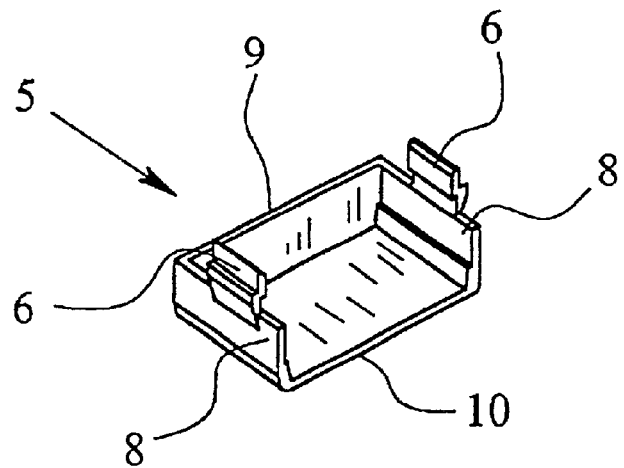
FIG. 3 shows a back view of the catch element of the electrical device as shown in FIG. 1.
Figure 4:
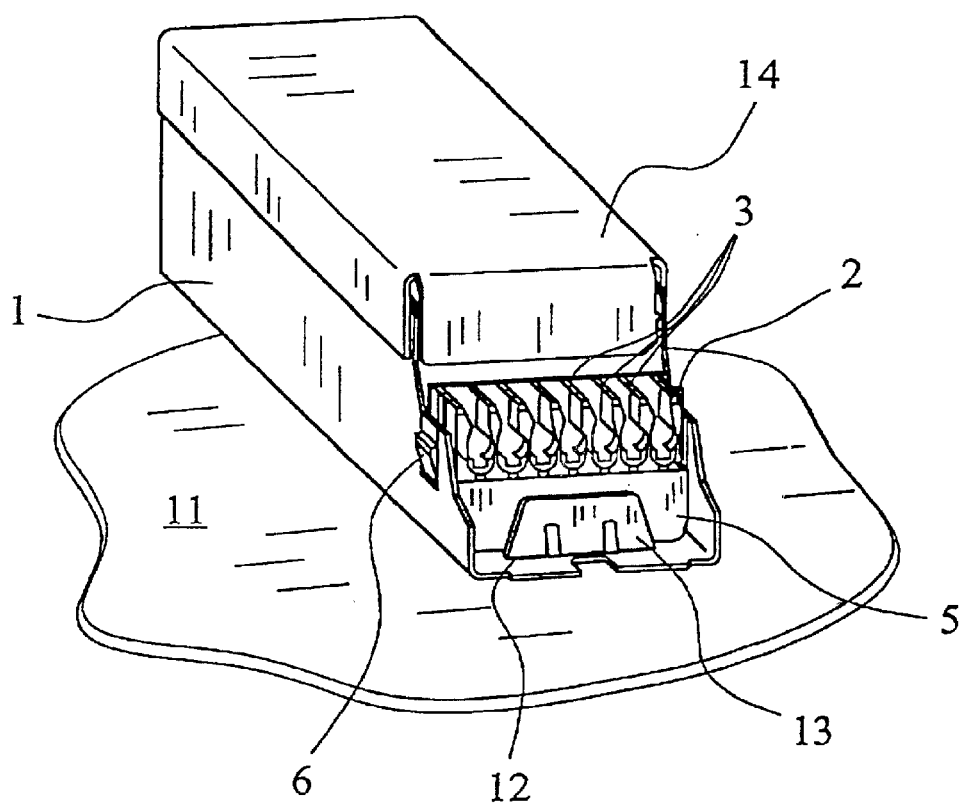
FIG. 4 shows an embodiment of an electrical unit in accordance with the present invention including the electrical device as shown in FIGS. 1 and 2 and a lamp diffuser.

FIG. 4 shows how the electrical device shown in FIGS. 1 and 2 is mounted on the bottom 11 of a lamp diffuser. In this mounting, the bottom of the housing 1 contains a slot 12 into which a catch clip 13 which projects upward perpendicularly from the lamp diffuser bottom 11 is locked. As stated above, this provides very accurate positioning of the terminal 2 with its terminal sites 3 relative to the lamp bottom. In the state which is fully installed to the lamp diffuser, the housing 1 is closed by means of a cover 14 which covers the top surface of the housing.

Figure 5:
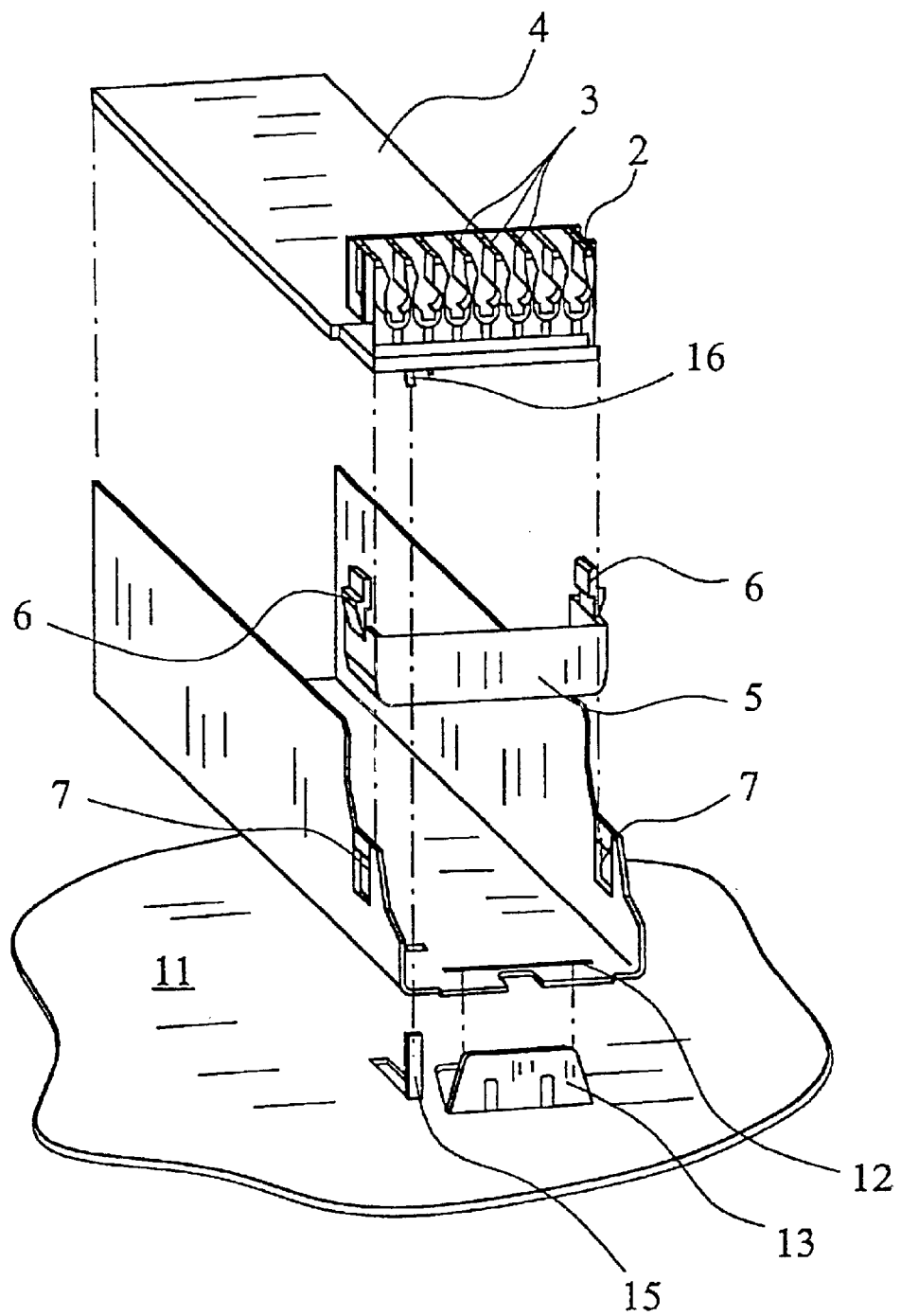
FIG. 5 shows a second embodiment of an electrical unit in accordance with the present invention including the electrical device as shown in FIGS. 1 and 2 and a lamp diffuser.

As illustrated in FIG. 5, the lamp diffuser 11 further includes a grounding barb 15 vertically extending perpendicularly to the lamp diffuser bottom 11 for connection to the ground connection 16 of the terminal 2. The ground connection 16 is made as a knife-edge contact so that when the grounding barb 15 is joined to the ground connection 16, the ground connection 16 with its knife-edge contact penetrates the surface of the grounding barb 15, thereby providing a reliable metal to metal contact even when the surface of the grounding barb 15 is coated. Since simple manufacture of the grounding barb 15 is achieved by punching out and partially bending out the grounding barb 15 from the lamp diffuser bottom 11, the grounding barb 15 is not routed around the housing 1; this would require that the grounding barb 15 runs bent. Instead, the grounding barb 15 is routed through a recess provided in the housing 1 and a recess provided in the catch element 5. Basically, there is contact of the grounding barb 15 with the housing 1 in the area of the recess in the housing 1. Reliable grounding of the housing 1 can, however, also be achieved by the housing 1 being connected separately to the ground connection 16 of the terminal 2.

We claim:

1. An electrical device comprising:

a housing;

a terminal having a plurality of receptacles, each of which being for connecting a respective one of a plurality of individual wires of at least one cable to the electrical device; and a catch element for connecting said terminal to said housing, wherein said catch element includes at least one one-piece catch leg which is shaped at one side for connecting said terminal to said catch element and is shaped at an opposite side for connecting said catch element to said housing such that the at least one leg forms an intermediate piece between the terminal and the housing.

2. The electrical device as claimed in claim 1 wherein said housing includes at least one side wall having a recess and wherein said leg of said catch element is receivably locked into said recess.

3. The electrical device as claimed in claim 2, wherein said terminal has a bottom surface and said leg of said catch element has a projection which extends laterally over said bottom surface so as to receive said terminal.

4. The electrical device as claimed in claim 1, wherein said housing includes two side walls extending vertically in reference to a bottom surface of said housing and in parallel to one another and said catch element has two legs extending vertically in reference to a bottom surface of said catch element and in parallel to one another.

wherein said two side walls respectively includes a recess which lockably receive said two legs.

5. The electrical device as claimed in claim 4, wherein a respective one of said two legs has a projection which points to an inner periphery of said catch element said projection extending laterally over the bottom surface of said terminal so as to receive said terminal.

6. The electrical device as claimed in claim 5, wherein said catch element includes a bottom surface, front wall vertically extending from said bottom surface, and two side walls vertically extending from said bottom surface and perpendicular to said front wall, said two side walls of said catch element having a leg vertically extending therefrom.

7. The electrical device as claimed in claim 6. wherein said catch element is composed of an electrical nonconductive material.

8. The electrical device as claimed in claim 7, wherein said electrical nonconductive material is plastic.

9. An electrical device comprising:

a housing;

a terminal for connecting of individual wires of at least one cable to the electrical device; and a catch element for connecting said terminal to said housing, wherein said catch element includes a one-piece catch leg for connecting said terminal to said catch element and for connecting said catch element to said housing wherein a respective one of said two legs has a projection which points to an inner periphery of said catch element, said projection extending laterally over the bottom surface of said terminal so as to receive said terminal, said catch element includes a bottom surface, front wall vertically extending from said bottom surface, and two side walls vertically extending from said bottom surface and perpendicular to said front wall, said two side walls of said catch element having a leg vertically extending therefrom, said catch element is composed of an electrical nonconductive material, said electrical nonconductive material is plastic; and wherein at least one of said front wall and said bottom surface of said catch element is used as a bottom insertion protection.

10. The electrical device as claimed in claim 1, wherein the inner surface of said housing is covered with an electrically insulating film.

11. The electrical device as claimed in claim 10, wherein said electrical device is an electrical ballast for fluorescent lamps.

* * * * *